L. J. MUELLER, Jr.
GRATE FOR HEATERS.
APPLICATION FILED DEC. 24, 1910.
1,068,002.
Patented July 22, 1913.
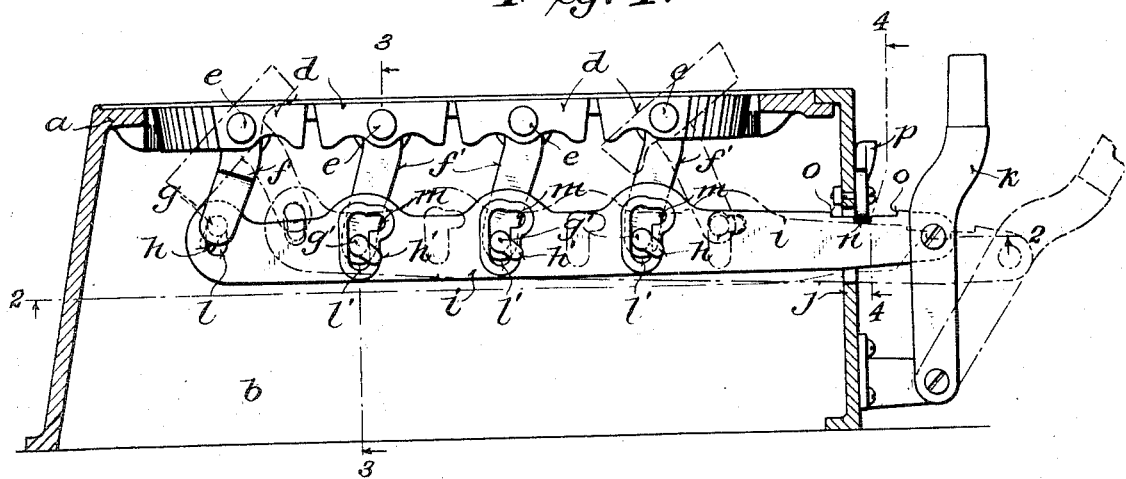
Fig. 1.
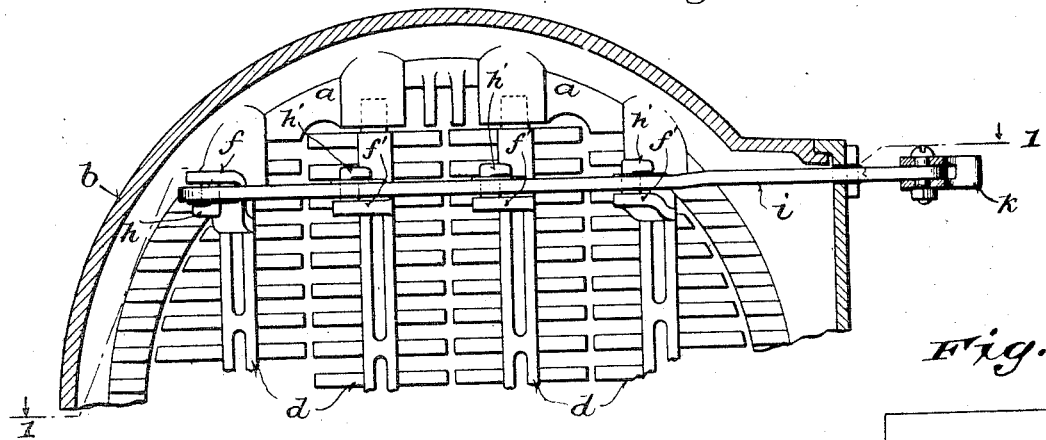
Fig. 2.
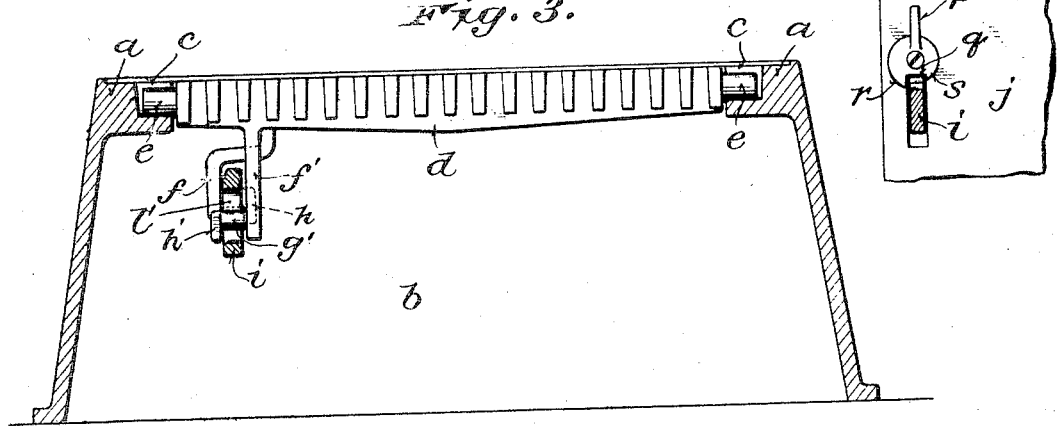
Fig. 3.
Fig. 4.
Witnesses:
Fred Palm
Chas. L. Goss
Inventor:
Louis J. Mueller Jr.
By Winkler Flanders Bottum & Fawsett
Attorneys.

UNITED STATES PATENT OFFICE.

LOUIS J. MUELLER, JR., OF MILWAUKEE, WISCONSIN, ASSIGNOR TO L. J. MUELLER FURNACE CO., OF MILWAUKEE, WISCONSIN, A CORPORATION OF WISCONSIN.

GRATE FOR HEATERS.

1,068,002.  Specification of Letters Patent.  Patented July 22, 1913.

Application filed December 24, 1910. Serial No. 599,179.

*To all whom it may concern:*

Be it known that I, LOUIS J. MUELLER, Jr., a citizen of the United States, residing at Milwaukee, in the county of Milwaukee and State of Wisconsin, have invented certain new and useful Improvements in Grates for Heaters, of which the following is a specification, reference being had to the accompanying drawing, forming a part thereof.

This invention relates to grates having oscillatory or rocking bars. Its main objects are to facilitate assembling the parts of the grate and replacing grate bars and to simplify and improve the construction and operation of grates of this class.

It consists in the construction, arrangement and combination of parts as hereinafter particularly described and pointed out in the claims.

In the accompanying drawing like characters designate the same parts in the several figures.

Figure 1 is a vertical section on the line 1 1, Fig. 2 through the base or ash pit of a heater embodying the invention, showing the grate bars and their operating connections in elevation; Fig. 2 is a horizontal section on the line 2, 2, Fig. 1, showing an inverted plan view of a portion of the grate; Fig. 3 is a vertical transverse section on the line 3 3, Fig. 1; and Fig. 4 is a vertical cross section on the line 4 4, Fig. 1, showing the pivoted latch which controls the operation of the grate.

The grate frame *a*, which is preferably cast as shown, integrally with the base or ash pit *b* of the heater, is formed on opposite sides with alined sockets *c*, which are open on the upper sides so that the grate bars can be dropped into place and easily assembled from above. The grate bars *d* are formed or provided at the ends with trunnions *e* loosely fitting and adapted to turn in said sockets. The rear grate bar is provided at one end with a depending arm *f*, having an inwardly projecting pivot pin *g* terminating in a lateral projection *h*, extending therefrom downwardly and rearwardly in an oblique direction when the grate bar is in normal working position, as shown in Fig. 1. The other grate bars are provided with similar arms *f'* having outwardly projecting pivot pins *g'* terminating in lateral projections *h'* extending downwardly and forwardly when the grate bars are in their normal working positions, as shown in Fig. 1. These arms with the pivot pins and lateral projections thereon, are preferably made of malleable iron, which is strong and durable, cast into the grate bars *d*.

A horizontal connecting and operating bar *i* passing through an opening in the door frame *j*, is pivotally connected with and supported by an operating lever *k* at its front end, and is suspended upon and supported by the pivot pin *g* of the rear grate bar at its rear end. It is formed with a vertically elongated opening *l* through which the pivot pin *g* with its projection *h* will pass when the rear grate bar is tilted into dumping position. It is also formed with vertically elongated openings *l'* for the pivot pins *g'* of the other grate bars. These openings have lateral offsets *m* at their upper ends through which the pivot pins *g'* with their projections *h'* will pass when the grate bars are tilted into dumping position. The arm *f* on the rear grate bar located on the outside, and the arms *f'* on the other grate bars located on the inside of the connecting bar *i*, with the lateral projections *h* and *h'* on the pivot pins *g* and *g'*, securely hold said connecting bar in place, maintaining the working pivot connections between it and said arms without other fastenings. The pivots on which the bar *i* is supported at its ends describe different arcs from those described by the pivot pins *g'* which are thus caused to move up or down in the elongated openings *l'* when said bar is moved lengthwise and the grate bars *d* are rocked. When the connecting bar *i* is pulled forward and the grate bars are tilted into dumping position, as indicated by dotted lines on Fig. 1, the projections *h'* on the pivot pins *g'* are brought opposite the lateral offsets *m* of the openings *l'* and any of the grate bars may be removed and replaced independently of the others. In other positions of the bar *i* the projections *h* and *h'* are out of register with the openings *l* and *l'* and the offsets *m* of the openings *l'*, and said bar is thus securely held in place on the pivot pins *g* and *g'* when the grate bars are being rocked, as well as when they are in their normal working positions.

To remove any of the grate bars except the rear bar, the end opposite or farthest from its arm *f'* is lifted, thereby withdrawing the pivot pin *g'* with its projection *h'* out of engagement with the connecting bar *i*. It is then free and may be removed through the feed door of the heater. By reversal of these operations, a grate bar may be replaced in operative engagement with the connecting bar *i*. To remove and replace the rear grate bar, the front end of the connecting bar *i* is crowded outward or away from the ash pit door, thereby carrying its rear end inward away from the arm *f* and off from the pivot pin *g*, the bar *i* being allowed sufficient lateral play with relation to the arms *f'* to admit of this operation. The grate bar is then free and may be lifted out of the frame *a*. It is replaced in a similar manner by a reversal of the above mentioned operations.

The connecting bar *i* is formed in its upper edge with a notch *n* and on opposite sides of and equal distances from said notch with shoulders *o*, for engagement with a latch *p* pivoted to the door frame to lock the grate bars in their normal or working position, as shown in Fig. 1, and to limit the oscillatory or rocking movement of the grate bars for shaking the grate.

As shown in Fig. 4, the latch *p* is formed with a notch *q* through which the shoulders *o* will freely pass when the latch is in its central position, to permit the grate bars to be tilted into dumping position. On opposite sides of this notch the latch is formed with tongues *r* and *s* of different radii or lengths, the first adapted to engage with the notch *n* in the bar *i* to lock the grate bars in their normal working position when the latch is turned to the left, and the other adapted to engage with the shoulders *c* on the bar *i* and thereby limit the oscillatory or rocking movement of the grate bars for shaking the grate when the latch is turned to the right. The proper manipulation of the latch facilitates the operation of the grate, relieving the operator of the necessity of exercising particular care, and insuring the grate bars being left in proper working position with their flat faces presented to the fire, in which position their teeth or prongs do not project into the fire and are not liable to be burned off or injured.

I claim:

1. A grate for heaters comprising a base or frame having alined sockets open on the upper side, grate bars having trunnions which are removably fitted in said sockets and having adjacent to one end depending arms which are provided with pivot pins terminating in lateral projections and a connecting bar having rocking supports adjacent to its end and formed with openings elongated vertically and having at their upper ends lateral offsets through which the pivot pins with their lateral projections may be inserted when the bars are tilted into a certain abnormal position, said pivot pins describing different arcs from those described by said rocking supports, and moving up and down in said elongated openings when the connecting bar is reciprocated.

2. A grate for heaters comprising a base or frame having sockets open on the upper side, rocking grate bars having trunnions at the ends which are removably fitted in said sockets and having adjacent to one end thereof depending arms which are provided with pivot pins terminating in lateral projections, a connecting and operating bar formed with vertically elongated openings having lateral offsets through which the pivot pins of certain grate bars may be inserted or withdrawn when they are turned to a certain abnormal position and an operating lever pivoted to and supporting the front end of said connecting bar, the arm of the rear grate bar being located on the opposite side of the connecting bar from the arms of the other grate bars, and the rear end of said connecting bar being suspended on the pivot pin of the rear grate bar and describing a different arc from the arcs described by the pivot pins of the other grate bars when they are rocked.

3. A grate for heaters comprising a base or frame having open sockets on opposite sides thereof, grate bars having at the ends trunnions which are fitted to turn in said sockets and having adjacent to one side of the grate depending arms which are provided with pivot pins, a connecting bar having openings for said pivot pins, the arm on the rear grate bar being located on the opposite side of the connecting bar from the arms of the other grate bars and supporting the rear end of the connecting bar, and the holes in the connecting bar for the pivot pins of the other grate bars being vertically elongated to permit said pins to play up and down therein when the bars are rocked, and an operating lever pivoted to and supporting the front end of said connecting bar, the rocking pivot supports of the connecting bar describing different arcs from those described by the pivot pins working in the vertically elongated holes of said bar.

4. The combination with a grate having rocking grate bars provided adjacent to one end thereof with depending arms, of a connecting bar pivoted to said arms and having a notch in one edge adjacent to its front end and shoulders on opposite sides of said notch, an operating lever connected with said connecting bar and a pivoted latch having a notch through which said shoulders will pass for dumping the grate, and on opposite sides of said notch tongues of different radii or lengths, one adapted to engage with said shoulders and limit the rocking movement of the grate bars and the other to engage with the notch in the connecting bar and lock the grate bars in their normal position.

5. In a grate for heaters the combination of a frame having alined sockets on opposite sides thereof, grate bars provided at the ends with trunnions removably fitted in said sockets and at one end with depending arms having pivot pins projecting laterally therefrom, some of said pins projecting in one direction and the others, in the opposite direction, parallel with the axes of the bars, and a connecting bar having openings for said pivot pins, said arms being arranged on opposite sides of said connecting bar and normally confining the same in place between them.

In witness whereof I hereto affix my signature in presence of two witnesses.

LOUIS J. MUELLER, Jr.

Witnesses:
E. S. SEIMS,
CHAS. L. GOSS.